Aug. 28, 1934.   H. L. BOTTLE ET AL   1,971,326
BROILER
Filed March 23, 1928
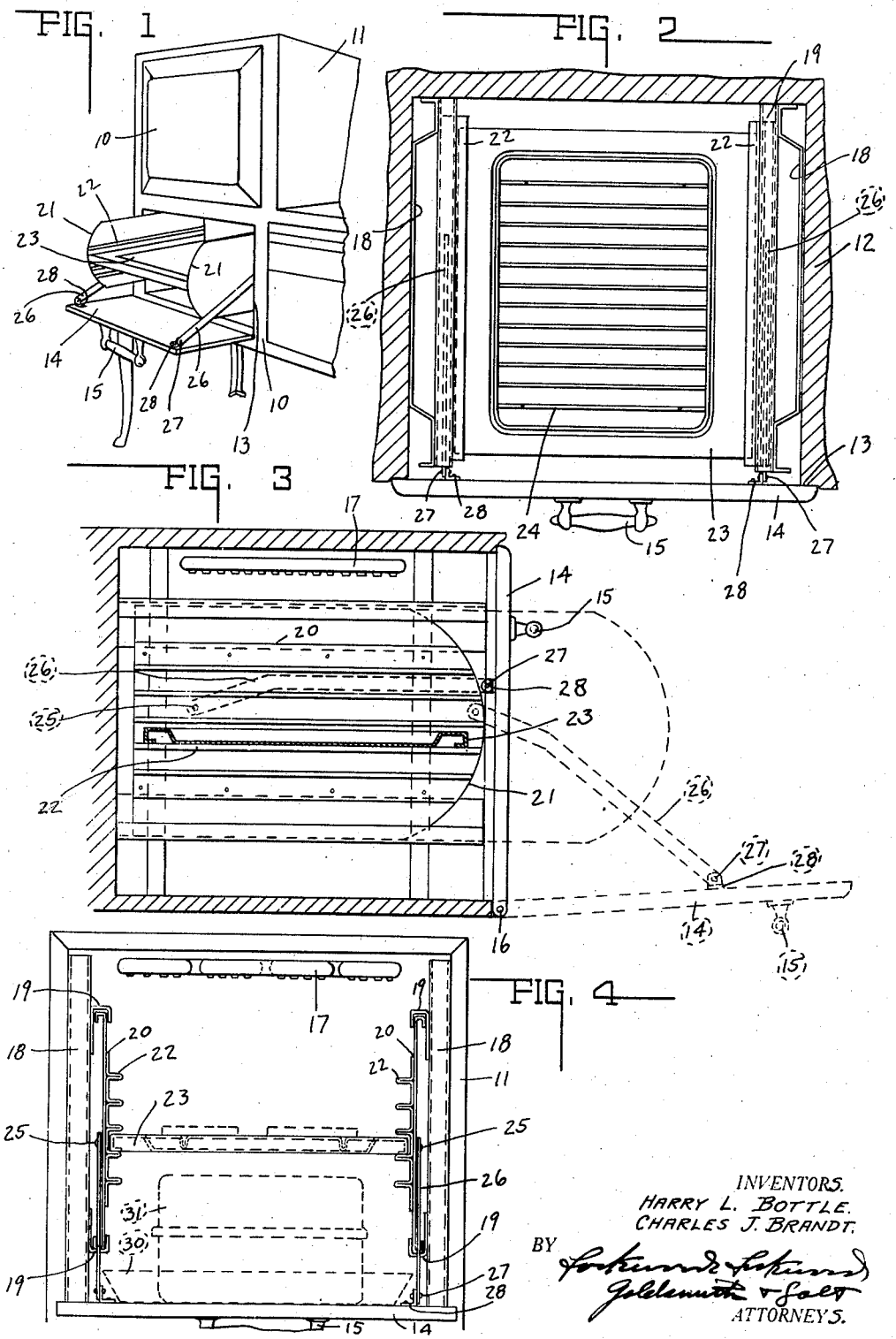
INVENTORS.
HARRY L. BOTTLE.
CHARLES J. BRANDT.
BY
ATTORNEYS.

Patented Aug. 28, 1934

1,971,326

UNITED STATES PATENT OFFICE 1,971,326

BROILER

Harry L. Bottle and Charles J. Brandt, Anderson, Ind., assignors, by mesne assignments, to Geo. D. Roper Corporation, Rockford, Ill., a corporation of Illinois Application March 23, 1928, Serial No. 264,189

3 Claims. (Cl. 126—340)

This invention relates to a broiling oven particularly adaptable for gas stoves.

The chief object of this invention is to provide a removable broiler construction for a gas stove or the like which will be alternately removable from the oven when the door is opened and by the door in the opening movement thereof to permit the article to be broiled to be positioned on the broiler or removed therefrom or turned or basted, as desired or required.

The chief feature of the invention consists in the provision of guide means in the linings of the broiler for slidably supporting the broiler slides in turn adjustably and slidably supporting the broiler pan, grid or the like, and connecting said broiler pan supporting broiler slides to the door so that the pan is removed by and with the slides in the opening of the door and is returned in the closing movement of the door.

The full nature of the invention will be understood from the accompanying drawing and the following description and claims:

In the drawing Fig. 1 is a perspective view of a portion of a gas stove showing a baking oven compartment and a broiler oven compartment therebeneath with the door thereof in open position and with the broiler slides and broiler pan or support projected from the oven. Fig. 2 is a top plan view of the broiler, pan, oven and door with the parts in the closed position. Fig. 3 is a longitudinal sectional view through the broiler oven. Fig. 4 is an enlarged front elevational view with the door in open position.

In the drawing 10 indicates a gas stove having an upper baking compartment 11 and a lower broiling compartment 12 provided with a front opening 13 closed by a door 14 which includes the handle 15 and the pivot or hinge 16 herein shown supporting the door at its bottom edge. It may support the door at the top edge, if desired, but when arranged as set forth, the door, when open (see Fig. 3, dotted lines) serves as a support, if and when desired. The oven is provided with the burners 17 which are adapted to utilize gas of suitable character. When a single unit broiler is employed the burners are positioned at the top of the compartment. When a double unit, such as shown in Fig. 1, is employed, the burners are positioned intermediate the compartments so that the same burners may serve for both.

The broiler compartment mechanism is mounted within the oven casing indicated generally by the numeral 12 and comprises a pair of side frames 18 which at each side include the parallel upper and lower channel-shaped guides or tracks 19. Mounted in each pair of tracks 19, the grooves of which face towards each other, is a broiler track wall or slide 20 having a curved forward end 21 and provided upon its inner face with a plurality of flanges 22 forming guides adapted to support a broiler pan 23 having the grid rack 24. Each slide is bent outwardly at its upper and lower edges to form longitudinally extending channel-shaped portions slidably received in the guides 19, whereby to leave a space between each slide and its associated side frame 18 to permit the operation therein of the means providing an operating connection between the slide and the oven door. Each slide is pivotally connected at 25 to one end of an angular link or lever 26, the opposite end being pivotally connected at 27 to an abutment 28 carried by the door 14. When the door is opened, as shown by the dotted lines in Fig. 3, the link construction withdraws the broiler side walls 20 from the oven and with it moves the broiler pan 23.

As shown in perspective in Fig. 1, this exposes the pan and the contents for observation, etc. as previously set forth. Closing of the door 14 returns the broiler pan and the broiler side walls into nested relation within the broiler oven unless the broiler pan is removed. Since the grooves 19 confine each broiler slide, no cross member is required. As shown by the dotted lines in Fig. 4, a drip pan 30, or a steamer 31, may be utilized in the broiler compartment either with or without removal of the broiler, grid and pan 23.

The invention claimed is:

1. In a cabinet structure having a door for a compartment therein, said door being arranged to swing down in opening, a pair of slides vertically disposed at opposite sides of said compartment having means on the inside thereof for supporting a pan therebetween at different elevations, a pair of longitudinal guides for each side of the compartment cooperating with the upper and lower ends of the slides to permit movement of the latter forwardly and rearwardly out of and into the compartment, the slides and guides being conformed so as to leave space between the slides and the sides of the compartment for slide operating means, said slide operating means comprising a pair of links disposed in said spaces at opposite sides of the compartment pivotally connected at their inner ends to the back of the slides at points between the longitudinal guides and at their outer ends to the door.

2. In a cabinet structure having a door for a compartment therein, said door being arranged to swing down in opening, a pair of slides vertically disposed at opposite sides of said compartment having means on the inside thereof for supporting a pan therebetween at different elevations, a pair of longitudinal guides for each side of the compartment cooperating with the upper and lower ends of the slides to permit movement of the latter forwardly and rearwardly out of and into the compartment, the guides being channel-shaped and projecting inwardly toward each other from the opposite sides of the compartment, each pair of guides having the channels facing one another, the upper and lower edges of each slide being formed so as to provide outwardly projecting portions channel-shaped in cross-section and slidably received in said guides, the slides being thus supported in laterally spaced relation to the sides of the compartment to permit the operation between the slides and the compartment walls of slide operating means, said slide operating means comprising a pair of links disposed in said spaces at opposite sides of the compartment pivotally connected at their inner ends to the back of the slides and at their outer ends to the door.

3. In a cabinet structure having a door for a compartment therein, said door being arranged to swing down in opening, a pair of slides vertically disposed at opposite sides of said compartment having means on the inside thereof for supporting a pan therebetween at different elevations, a pair of longitudinal guides for each side of the compartment cooperating with the upper and lower ends of the slides to permit movement of the latter forwardly and rearwardly out of and into the compartment, the guides being channel-shaped and projecting inwardly toward each other from the opposite sides of the compartment, each pair of guides having the channels facing one another, the upper and lower edges of each slide being formed so as to provide outwardly projecting portions channel-shaped in cross-section and slidably received in said guides, the slides being thus supported in laterally spaced relation to the sides of the compartment to permit the operation between the slides and the compartment walls of means for moving the slides, and means operated in the opening and closing of the door and disposed in said space between the slides and compartment walls for moving the slides out and in in the opening and closing of the door, respectively.

HARRY L. BOTTLE.
CHARLES J. BRANDT.